UNITED STATES PATENT OFFICE.

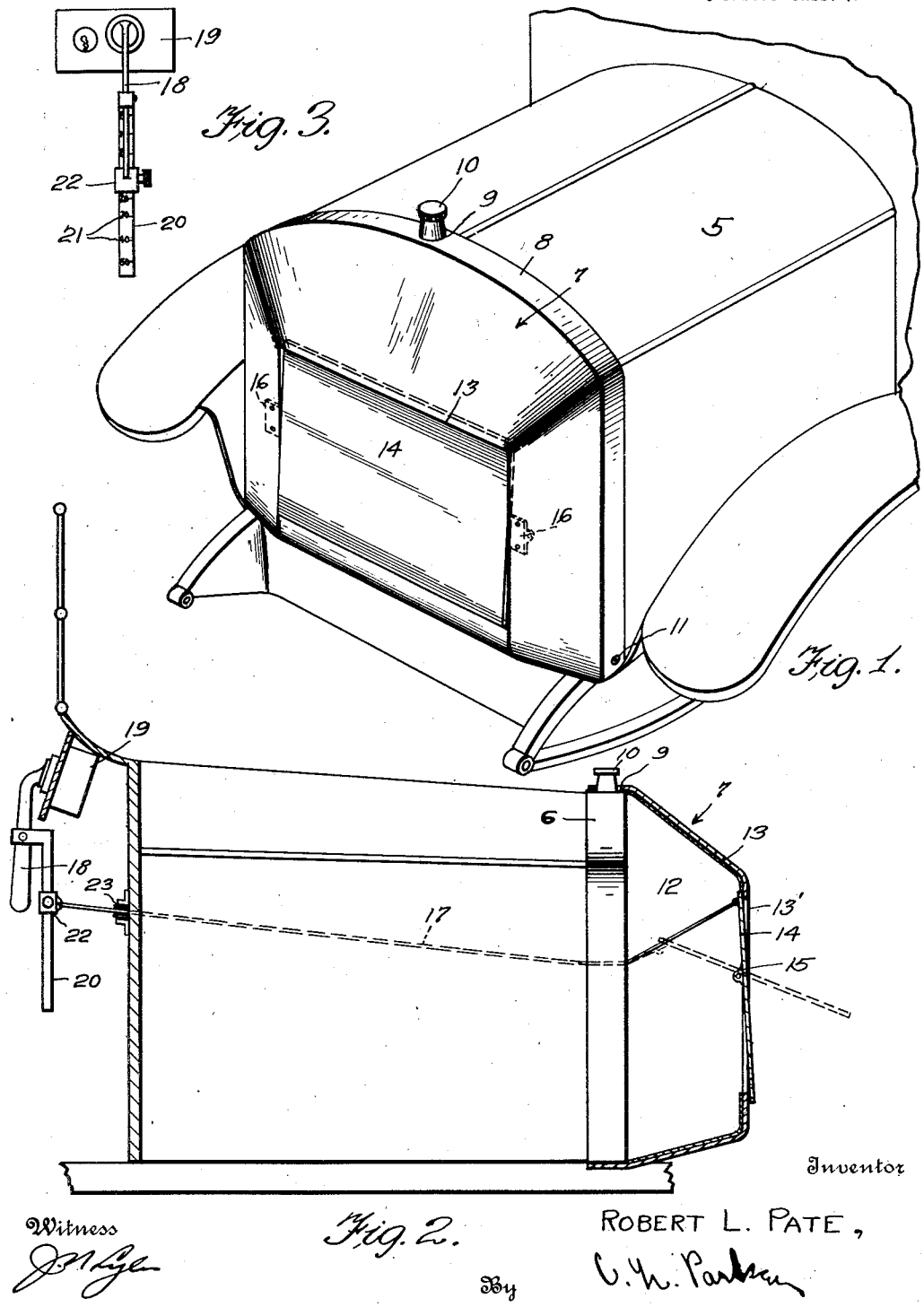

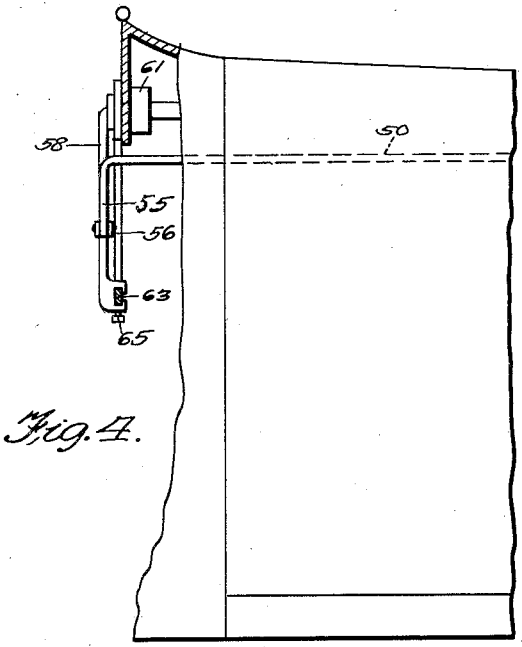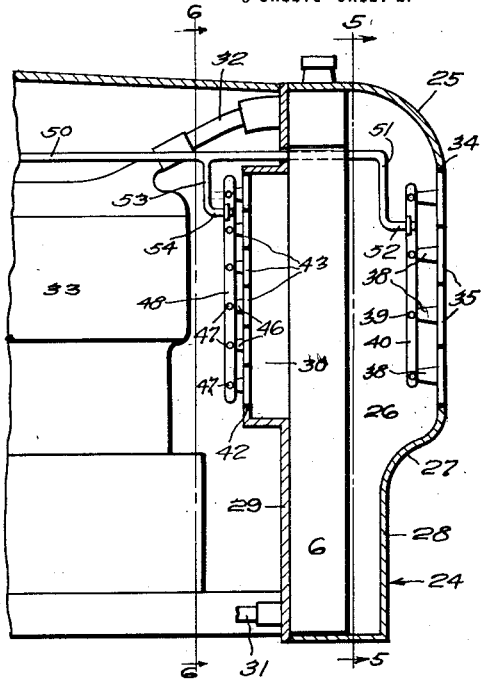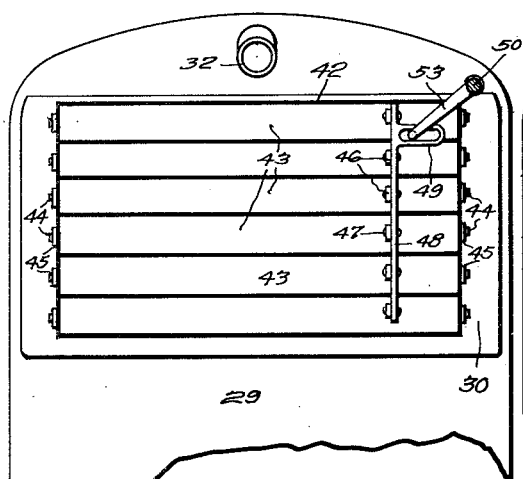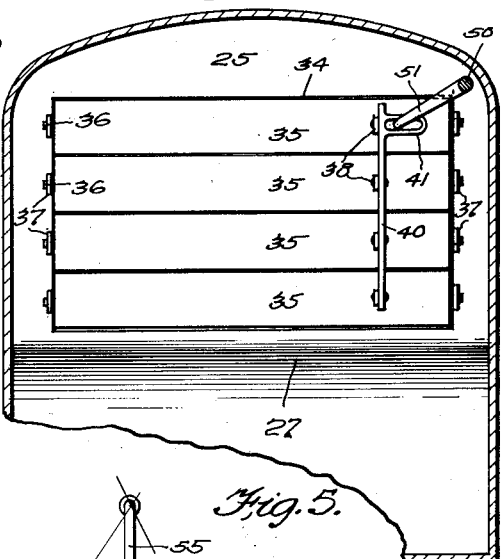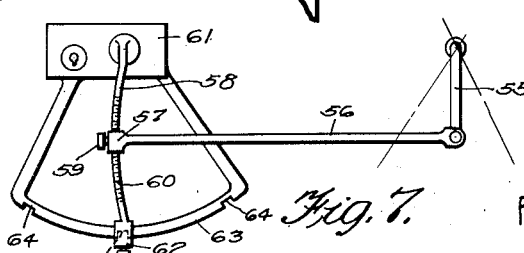

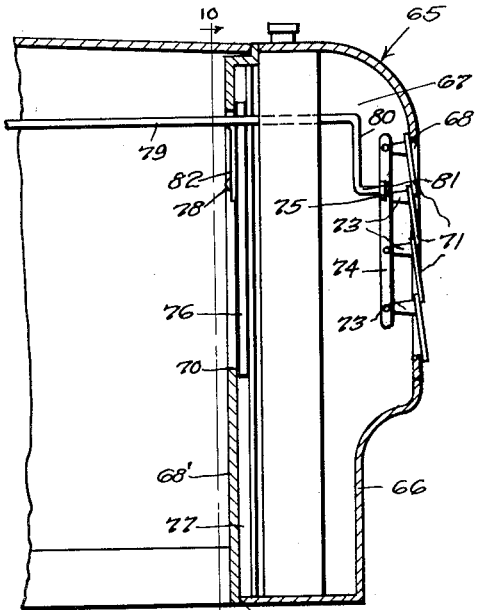
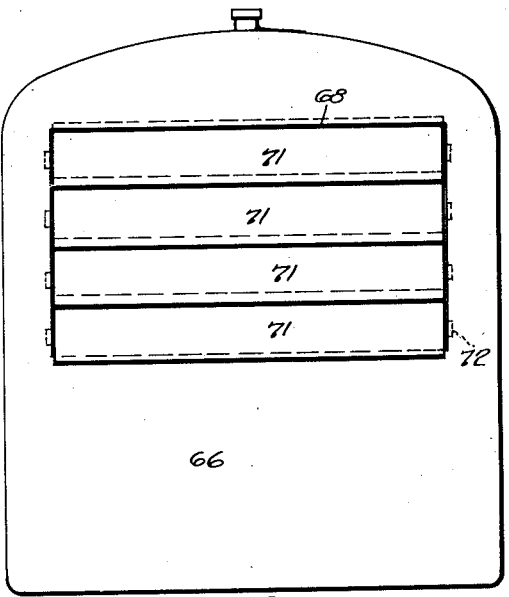
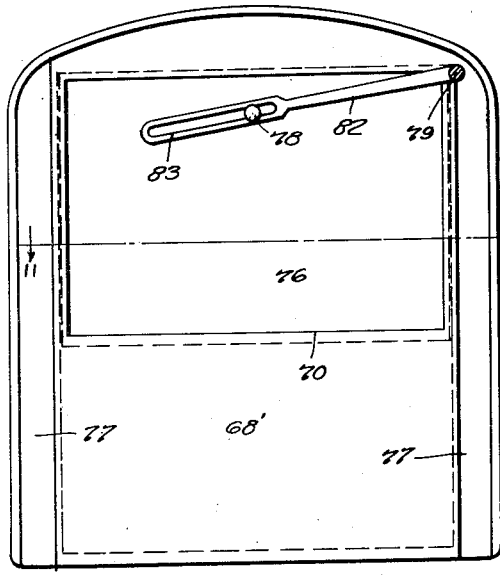
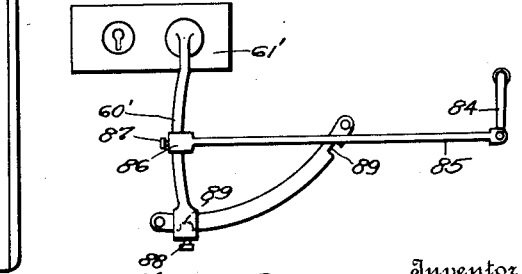
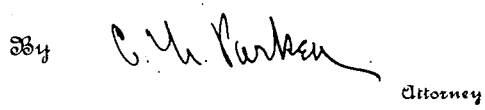

ROBERT L. PATE, OF SPRINGFIELD, MISSOURI.

DEVICE FOR CONTROLLING THE TEMPERATURE OF AUTOMOBILE-RADIATORS.

1,392,521.      Specification of Letters Patent.      Patented Oct. 4, 1921.

Application filed April 30, 1919. Serial No. 293,867.

*To all whom it may concern:*

Be it known that I, ROBERT L. PATE, a citizen of the United States, residing at Springfield, in the State of Missouri, have invented certain new and useful Improvements in Devices for Controlling the Temperature of Automobile-Radiators, of which the following is a specification.

My invention relates to apparatus for controlling the temperatures of automobile radiators.

An important object of the invention is to provide means whereby the heat within the radiator caused by the operation of the engine is suitably retained when the engine is stopped, and a suitable circulation of air through the radiator is provided as soon as the engine is started.

A further object of the invention is to provide a device of the above mentioned character which is simple in construction, inexpensive to manufacture, strong and durable.

This application is a continuation, in part, of my co-pending application for devices for controlling the temperatures of an automobile radiator, filed February 10, 1917, Serial No. 147,826, now Patent No. 1,338,585, dated April 27, 1920.

Other objects and advantages of the invention will be apparent during the course of the following description.

In the accompanying drawings forming a part of this specification, and in which like numerals are employed to designate like parts throughout the same:

Figure 1 is a perspective view of apparatus embodying my invention;

Fig. 2 is a central vertical longitudinal sectional view through the same, parts being shown in elevation;

Fig. 3 is a detail elevation of the ignition lever and associated elements;

Fig. 4 is a longitudinal vertical sectional view through a second form of apparatus embodying my invention;

Fig. 5 is a transverse sectional view, taken on line 5—5 of Fig. 4;

Fig. 6 is a transverse sectional view, taken on line 6—6 of Fig. 4;

Fig. 7 is a side elevation of the operating means for the ventilators or shutters;

Fig. 8 is a vertical longitudinal sectional view through a third form of apparatus embodying my invention;

Fig. 9 is a front elevation of the same;

Fig. 10 is a similar view, taken on line 10—10 of Fig. 8;

Fig. 11 is a horizontal sectional view, taken on line 11—11 of Fig. 10; and,

Fig. 12 is a side elevation of the operating means for the ventilators or shutters.

In the drawings, wherein for the purpose of illustration is shown a preferred embodiment of my invention, attention being called first to Figs. 1 to 3, inclusive, the numeral 5 designates the hood of an automobile covering the usual internal combustion engine. Arranged in advance of the engine is a radiator 6 of any well known or preferred construction, which is connected with the water-jacket of the engine.

My invention comprises a casing 7, which preferably tapers forwardly, and is provided at its rear end with a flange 8, to be positioned upon the radiator 6 and secured thereto by any suitable means. The top portion of the flange 8 may be provided with an opening 9, for receiving the water inlet 10 of the radiator, and the lower portion of the flange may be clamped to the radiator by set screws 11 or the like. Particular attention is called to the fact that the casing 7 projects forwardly beyond the radiator 6 for a substantial distance, providing a chamber 12 of substantial size for retaining the heated air therein.

The casing 7 is provided at its forward tapered end with an opening 13', adapted to be covered and uncovered by a movable ventilator or shutter 14. This ventilator or shutter is provided between its upper and lower ends with trunnions 15, pivoted within brackets or bearings 16, secured to the inner surface of the casing 7. Particular attention is called to the fact that these trunnions or pivot points are arranged substantially nearer the upper end of the ventilator 14 than its lower end, whereby the ventilator has a lower center of gravity and will automatically assume a vertical position when released, its upper end contacting with the inner wall of the casing and its lower end with the outer wall, as shown.

Connected with the upper portion of the movable ventilator 14 is a flexible element, such as a cable 17. This cable has its rear end adjustably connected with the ignition switch lever 18 by means to be described. This ignition switch lever operates the switch 19, which is swung from the neutral position, in starting the engine and during its operation. The lever 18 is pivoted to swing transversely of the automobile. Clamped to the lever 18 is a rod 20, extending longitudinally thereof, and therefore swinging upon the same pivot as the lever. This rod is graduated, as shown at 21, for indicating the temperature of the weather. This graduation has "0" degree, and the figures above it, indicate the number of degrees below zero, while the figures below "0" indicate the number of degrees above zero. A slide 22 is longitudinally adjustable upon the rod 18 and is adapted to be clamped thereto at a selected position, and this slide is connected with the rear end of the cable 17, the cable passing over a pulley 23. It is obvious that when the slide is moved toward the lower end of the rod 21 the ventilator 14 will be opened for a larger extent.

The operation of the apparatus is as follows:

When the engine is stopped, the ignition lever 18 is in the neutral position, and the cable 17 moves forwardly to close the ventilator 14. To start the engine, the ignition lever 18 is swung in one direction, and this movement draws the cable 17 inwardly opening the ventilator 14, whereby air may circulate through the radiator to cool the same.

Attention being now called to Figs. 4, 5, 6 and 7, the numeral 24 designates a casing as a whole, which is placed upon the radiator 6. This casing embodies a front section 25, projecting forwardly beyond the radiator 6 for a substantial distance for forming a chamber 26 of substantial volume. This chamber terminates at its lower end at a shoulder 27 formed by bending the material of the casing 24 inwardly, as shown at 28, whereby this lower portion is arranged closer to the radiator, and will not prevent the employment of the ordinary crank in starting the engine, if desired. The casing further comprises a rear section 29, which is disposed upon the rear side of the radiator and is provided with an upper portion 30, projecting rearwardly beyond the radiator for a substantial distance. The sections 25 and 29 are secured together by any suitable means.

The rear section 29 is provided with an opening near its lower end for the passage of the inlet pipe 31 of the water, while its upper end has an opening to receive the outlet pipe 32, these pipes being connected with the water jacket of the engine 33, as is well known.

The forwardly bulging portion or chamber 26 of the casing 25 is provided with an air circulating opening 34, receiving therein ventilators or shutters 35, adapted to be swung upon their longitudinal axes. As more clearly shown in Fig. 5, these ventilators or shutters are provided at their ends, and in their longitudinal axes, with pivot elements or trunnions 36, which are rotatable within brackets or bearings 37, rigidly secured to the casing section 25. As these ventilators or shutters 34 are normally disposed in the same plane, it is obvious that they may be shifted in opposite directions to assume open positions.

Connected with the ventilators or shutters 35 and projecting rearwardly therefrom at or near the longitudinal axes of the same, are cranks 38, which are pivotally connected as shown at 39, with a common link 40. This link is provided with a slotted extension 41 for a purpose to be described.

The extension or chamber 30 has an opening 42, in alinement with the opening 34 and this opening receives therein pivoted ventilators or shutters 43, which are adapted to be arranged in the same plane when closed, and may be turned upon their longitudinal axes in opposite directions. These ventilators or shutters 43, as shown in Fig. 6, are provided at their ends and in their longitudinal axes with pivot elements or trunnions 44 rotatable within brackets or bearings 45 fixed to the rear casing section 29. Attached to the ventilators or shutters 43 in their longitudinal axes are cranks 46, rigidly secured thereto, having pivotal connection, as shown at 47, with a common operating link 48. This operating link is provided with a slotted extension 49, as shown.

The numeral 50 designates a longitudinal rock shaft, which extends through the radiator, and has portions thereof arranged upon opposite sides of the same. At its forward end, the rock shaft 50 has a crank 51, carrying at its free end an extension 52, pivoted within the slotted extension 41 of the link 40. Rearwardly of the radiator 6 this rock shaft carries a second crank 53, provided with an extension 54, pivoted within the slotted extension 49. It is thus seen that when the rock shaft 50 is turned such motion will be transmitted to the two sets of ventilators or shutters, thereby turning them upon their longitudinal axes. At the rear end of the rock shaft 50 is a crank 55, to turn the same, and this crank has pivotal connection with a link or pitman 56. This link or pitman is provided at its opposite end with an apertured head 57, which is slidable upon an ignition switch lever 58, which is longitudinally curved, as shown. The head 57 carries a clamping bolt 59, to lock the head 57 upon the lever 58 at the desired position. The lever 58 is equipped with a scale 60, indicating the temperature of the atmosphere. This scale is similar to the scale 21. By sliding the head 57 longitudinally of the lever 58, and clamping it thereto in the desired position with relation to the scale the ventilators or shutters are caused to be opened for a greater extent, corresponding to the temperature of the atmosphere.

The ignition switch lever 58 is connected with the usual ignition switch 61, and this lever is provided at its free end with a head 62, slidably engaging a curved quadrant 63 having notches 64, receiving a catch 65 carried by the head 62. When the lever 58 is locked in the neutral position, as shown in Fig. 6, the engine is not running, and to start the engine the lever 58 may be swung to the right so that its catch 65 enters the notch 64. The ignition switch will now function to connect the spark plugs of the engine with the storage battery for starting the engine. With this movement of the lever 58, the ventilators or shutters are moved to the open position, in unison therewith so that air is supplied to the radiator upon starting of the engine. After the engine is started the lever 58 may be swung to the left, so that its catch 65 will engage within the other end notch 64, the switch 61 now serving to connect the spark plugs of the engine with the magneto. When the lever 60 is thus swung to the extreme position to the left, the ventilators are swung in the opposite direction to the open position. It is thus seen that the ventilators will remain closed when the lever is in the neutral position, but will be open when the ignition lever is in the starting or running position.

In Figs. 8 to 12, inclusive, I have shown a third different form of apparatus embodying my invention. This apparatus embodies a casing 65, including a forward casing section 66, having its upper portion formed into an enlarged chamber 67, provided with an opening 68. This forward casing section receives the radiator 6, as shown, and has suitable connection with a rear casing section 68', as shown at 69. This rear casing section has a ventilator opening 70, as shown.

Arranged within the opening 68 of the forward casing section are pivoted ventilators or shutters 71 adapted to turn upon their longitudinal axes. These shutters are provided at their ends with pivots or trunnions 72, having pivotal connection with the casing section 66. As clearly shown in Fig. 8, the ventilators or shutters 71 are adapted to overlap when closed. Connected with the ventilators or shutters 70 at their upper edges are cranks 73, having pivotal connection with a common link 74. This link is provided with a slotted extension 75, similar to the extension 41.

The numeral 76 designates a vertically movable or slotted ventilator or shutter arranged at the rear of the radiator to cover and uncover the opening 70 and sliding within guides 77. This sliding ventilator or shutter is equipped with a headed stud 78, for a purpose to be described.

The numeral 79 designates a longitudinal rock shaft, provided at its forward end with a crank 80, having an extension 81 pivoted within the slotted extension 75 similar to the extension 41. This rock shaft 79 also carries a long crank 82, rigidly secured thereto, and this crank is provided with an elongated slot 83 receiving the headed stud 78.

The rock shaft 79, at its rear end carries a crank 84, pivotally connected with a link 85, carrying an apertured head 86, provided with a clamping bolt 87. The head 86 is slidable upon a lever 60' similar to the lever 60 in Fig. 7. This lever is adapted to assume a neutral position in Fig. 12 and to be shifted only in one direction, to the right, to assume an operating or running position, the same being provided with a catch 88, to enter openings or notches 89. The ignition switch lever 60' operates an ignition switch 61' similar to the switch 61 and this ignition switch 61' is adapted to supply current to the spark plugs of the engine when the lever 60' is switched to the right and will cut off the current when the lever is in neutral position. It is thus seen that when the lever 60' is in the neutral position, the ventilator or shutter 76 will be closed and the shutters 71 will be closed. When the lever 60' is swung to the right, the ventilators or shutters 71 and the ventilator or shutter 76 will be open to admit air to the radiator.

In connection with the three forms of the invention, it might be stated that the casings which inclose the radiators and associated elements, may be formed of heat insulating material such as asbestos or a composition formed of asbestos, while of course the invention is in no sense restricted to this idea.

It is to be understood that the forms of my invention herewith shown and described are to be taken as the preferred examples of the same, and that various changes in the shape, size and arrangement of parts may be resorted to without departing from the spirit of the invention or the scope of the subjoined claims.

Having thus described my invention, I claim:

1. In apparatus of the character described, a casing to be arranged forwardly of the radiator of an automobile and provided in its forward end with an opening, a pivoted shutter to cover and uncover the opening, a pivoted lever provided with a scale for indicating temperature, a member longitudinally adjustably mounted upon the lever to travel in proximity to the scale, and means to connect the member and shutter.

2. A device for controlling the temperature of automobile radiators, comprising a casing adapted to receive the radiator and having front and rear sections disposed upon opposite sides of the radiator, said sections having air circulating openings formed therein, and shutters for controlling the volume of air passing through the openings.

3. A device for controlling the temperature of automobile radiators, comprising a casing adapted to receive the radiator and having forward and rear sections disposed upon opposite sides thereof, said sections having openings formed therein, and sets of pivoted shutters arranged within the openings and adapted to be swung in opposite directions.

4. The combination with the radiator of a motor vehicle, of a casing adapted to receive the radiator and having front and rear sections, a portion of the front and rear sections being offset to provide enlarged chambers at the front and rear of the radiator and sets of pivoted ventilators arranged within said chambers and adapted to be swung in opposite directions.

In testimony whereof I affix my signature in presence of two witnesses.

ROBERT L. PATE.

Witnesses:
WILLIAM D. TATLOW,
EWING Y. MITCHELL.